United States Patent
Costa

(10) Patent No.: US 7,489,864 B2
(45) Date of Patent: *Feb. 10, 2009

(54) METHOD AND SYSTEM FOR PROVIDING CONTROLLED IMPAIRMENTS TO AN OPTICAL TRANSPORT SYSTEM

(75) Inventor: Pierre Costa, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/598,430

(22) Filed: Nov. 13, 2006

(65) Prior Publication Data

US 2007/0058983 A1    Mar. 15, 2007

Related U.S. Application Data

(63) Continuation of application No. 10/038,502, filed on Dec. 20, 2001, now Pat. No. 7,155,121.

(51) Int. Cl.
*H04B 10/08* (2006.01)
(52) U.S. Cl. .................................. 398/25; 398/154
(58) Field of Classification Search ............ 398/16, 398/25, 51, 53, 54, 154, 155, 161
See application file for complete search history.

(56) References Cited

U.S. PATENT DOCUMENTS

| 4,287,606 | A | 9/1981 | Frosch et al. |
|---|---|---|---|
| 5,353,147 | A | 10/1994 | Grimes |
| 5,561,714 | A | 10/1996 | Hershberger |
| 5,646,997 | A | 7/1997 | Barton |
| 6,144,786 | A | 11/2000 | Chethik |
| 6,266,172 | B1 | 7/2001 | Zirngibl |
| 6,631,481 | B1 | 10/2003 | Hoard et al. |
| 6,694,098 | B1 | 2/2004 | Warbrick et al. |
| 7,155,121 | B2 * | 12/2006 | Costa ......................... 398/25 |

* cited by examiner

*Primary Examiner*—Christina Y Leung
(74) *Attorney, Agent, or Firm*—Brinks Hofer Gilson & Lione

(57) ABSTRACT

Systems and methods for providing controlled impairments to an optical transport system are disclosed. In one implementation, an optical stream is received. A clock signal and a data signal are identified based on the received optical signal. A selection indicating at least a particular bit position of the optical stream to be modified is received from a user and it is determined whether the particular bit position of the optical stream is located in an active video portion, a horizontally ancillary data portion, a vertically ancillary data portion, a start-video timing portion, or an end active video portion of the optical stream. The particular bit position in the determined portion of the optical stream is identified based on at least the clock signal and the data signal, and the particular bit position of the optical stream is modified.

13 Claims, 3 Drawing Sheets

METHOD AND SYSTEM FOR PROVIDING
CONTROLLED IMPAIRMENTS TO AN
OPTICAL TRANSPORT SYSTEM

RELATED APPLICATIONS

The present application is a continuation of U.S. patent application Ser. No. 10/038,502, filed Dec. 20, 2001, now U.S. Pat. No. 7,155,121 the entirety of which is hereby incorporated by reference.

TECHNICAL FIELD

The present invention relates to methods and systems for introducing controlled errors into a bit stream.

BACKGROUND

The video industry has adopted the Society of Motion Picture and Television Engineers (SMPTE) 259M (level C) standard almost exclusively for high quality video in studio and production applications. In some applications, a SMPTE 259M signal is to be transported to a remote location, which may be several miles away for example. Current methods of transporting SMPTE 259M signals or other professional quality video signals to remote locations use optical carriers, such as OC-12 channels or point-to-point fiber connectivity.

Bit errors may occur in an optical network which carries real-time SMPTE 259M video data. Determining video-frame-level consequences of incurring bit errors is difficult in the absence of protocol handshake and retransmission in transporting the real-time video data. Since interfaces (codecs) at the edge of the video network automatically change an original SMPTE 259M bit stream by generating a line code which differs from the original signal,

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Disclosed herein are methods and systems to manipulate in-transit digital signals riding on an optical link. The in-transit digital signal is preserved except for a very specific area where one wants to create at least one bit error. Also disclosed herein are methods and systems to manipulate specific areas of in-transit real-time video signals, such as SMPTE-standard signals, in either an optical form or an electrical form.

Figure 1:
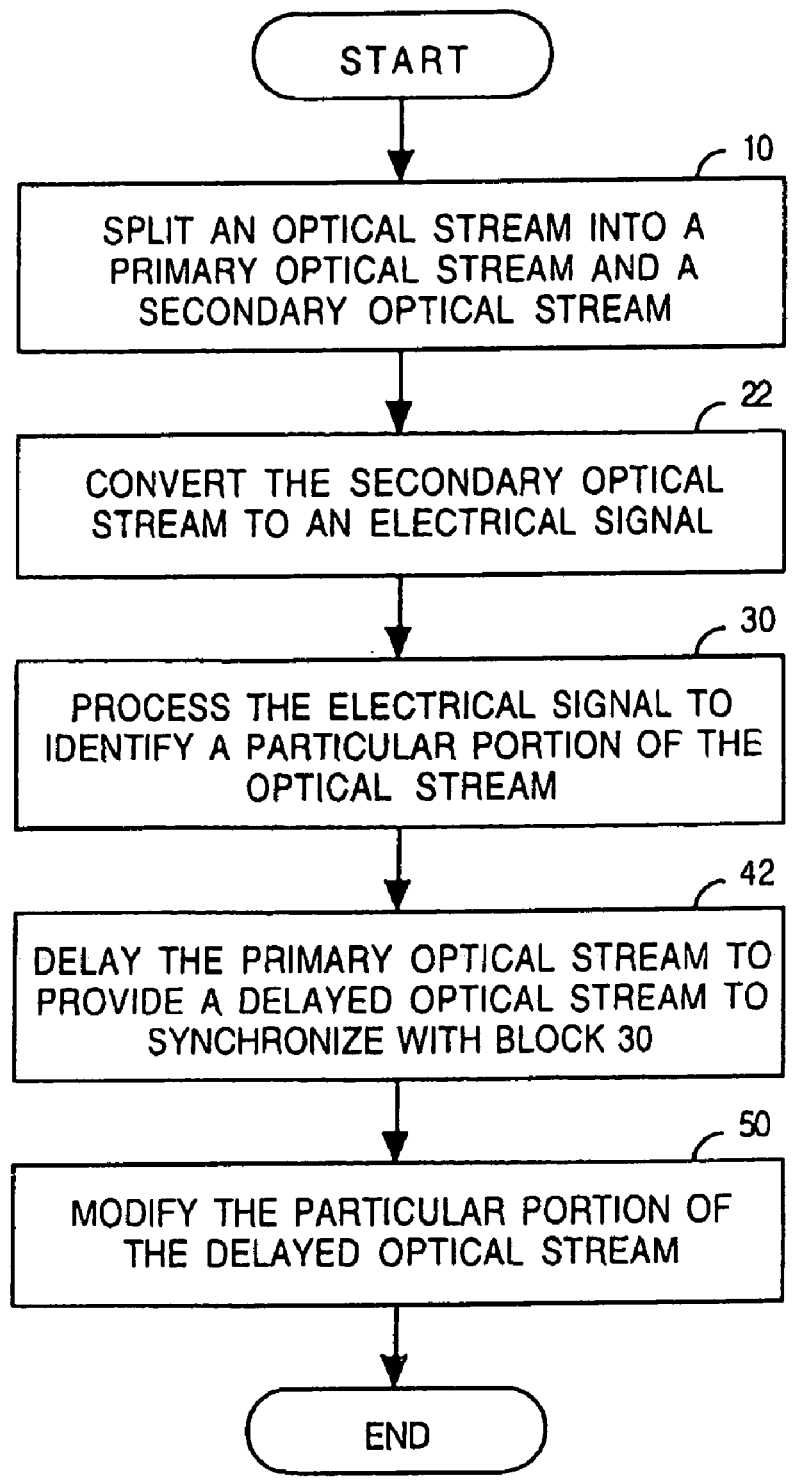
FIG. 1 is a flow chart of an embodiment of a method for providing controlled impairments to an optical transport system.

Embodiments of the present invention are described with reference to FIG. 1, which is a flow chart of an embodiment of a method for providing controlled impairments to an optical transport system, and FIG. 2, which is a block diagram of an embodiment of a system for providing controlled impairments to an optical transport system.

As indicated by block 10, the method comprises splitting a digital optical stream 12 into a primary optical stream 14 and a secondary optical stream 16. In general, the teachings herein may be applied regardless of what data are encoded by the digital optical stream 12. Of particular interest, however, is the digital optical stream 12 comprising a real-time video stream, such as a SMPTE 259M video stream or another SMPTE-standard video stream or any bit stream transmitted on an optical link.

An optical splitter 20, such as one which operates in the 1310 nm to 1550 nm wavelengths, is used to split the digital optical stream 12. Preferably, the optical splitter 20 splits an insignificant amount of light (e.g. 10% or less) to produce the secondary optical stream 16. The primary optical stream 14 comprises the remaining light (e.g. 90% or more). In general, the optical splitter 20 splits more light to the first optical stream 14 than to the secondary optical stream 16. As illustrated in FIG. 2, the system has a strictly-optical upper path for processing the primary optical stream 14, and a lower path which processes an electrical form of the secondary optical stream 16.

As indicated by block 22, the method comprises converting the secondary optical stream 16 to an electrical signal 24. An optoelectronic converter 26 serves to convert the secondary optical stream 16 to the electrical signal 24.

As indicated by block 30, the method comprises processing the electrical signal 24 to identify a particular portion of the digital optical stream 12. The particular portion may comprise a particular bit position in the digital optical stream 12. For a SMPTE-standard video stream, such as a SMPTE 259M video stream, the aforementioned act may comprise identifying a particular part of a video frame, such as an active video portion, a horizontal ancillary data portion (HANC), a vertical ancillary data portion (VANC), or a timing portion such as start active video (SAV) or end active video (EAV).

Preferably, the act of processing comprises recovering a clock signal 32 and a data signal 34 from the electrical signal 24. A phase-locked-loop (PLL)/clock recovery component 36 serves to recover the clock signal 32 and the data signal 34. In addition, the PLL/clock recovery component 36 can function to automatically recover the clock from multiple link speeds. Further, the act of processing may comprise identifying the particular portion based on the clock signal 32 and/or the data signal 34. A logic component 38 serves to identify the particular portion based on the clock signal 32 and/or the data signal 34. Based on the aforementioned processing acts, the logic component 38 may generate a gating signal 40 at the particular portion.

The combination of the PLL/clock recovery component 36 and the logic component 38 is an embodiment of a processor 41 to process the electrical signal 24 to identify the particular portion. It is noted, however, that alternative embodiments of the processor 41 are also within the scope of this disclosure.

As indicated by block 42, the method comprises delaying the primary optical stream 14 to provide a delayed optical stream 44. An optical delay 46 serves to precisely delay the primary optical stream 14. The optical delay 46 is a precision optical delay line to compensate for the delay in the lower path to synchronize the delayed optical stream 44 with the gating signal 40.

As indicated by block 50, the method comprises modifying the particular portion of the delayed optical signal 44. This act may comprise inverting one or more bits in the particular portion of the delayed optical stream 44. In other words, each logical "1" bit in the portion is inverted to form a logical "0" bit, and each logical "0" bit in the portion is inverted to form a logical "1" bit. Alternatively, this act may comprise suppressing one or more bits in the particular portion of the delayed optical stream 44. In other words, all of the one or more bits are suppressed (e.g. all of the one or more bits become logical "0" bits). Regardless of how the one or more bits are modified, one or more bit errors are introduced into the digital optical stream 12, such as a SMPTE-standard video stream. For a SMPTE-standard video stream, such as a SMPTE 259M video stream, the one or more bit errors are introduced only in a specific portion of a video frame, such as the active video portion, the HANC, the VANC, the SAV, or the EAV.

An optical switch 52 is responsive to the processor 41 to modify the particular portion of the delayed optical signal 44 based on the gating signal 40. In one embodiment, the optical switch 52 is used to selectively permit and inhibit light from passing from its input 54 to its output 56. The optical switch 52 has a switching time of 1 nanosecond or less in order to gate off a specific bit.

The output 56 provides an optical output stream 58 which is the same as the digital optical stream 12, except for one or more particular bit positions being suppressed. The optical output stream 58 may be provided to a decoder (not illustrated), and optionally a display (not illustrated), to examine the overall effect of the bit suppression on one or more video frames.

It is noted that the acts described with reference to FIG. 1 typically are not performed in a sequence shown in FIG. 1. For example, the acts indicated by reference numerals 22 and 30 are typically performed concurrently with the act indicated by block 42.

Figure 3:
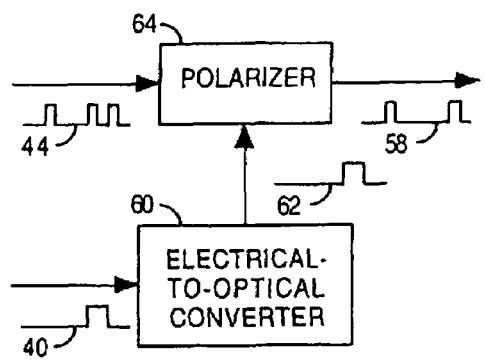
FIG. 3 is a block diagram of an embodiment of the optical switch in FIG. 2.

FIG. 3 is a block diagram of an embodiment of the optical switch 52. The optical switch 52 comprises an electrical-to-optical converter 60. The electrical-to-optical converter 60 converts the gating signal 40, having an electrical form, to an optical gating signal 62. An optical polarizer 64 is responsive to the delayed optical stream 44 and the optical gating signal 62. The optical polarizer 64 permits a transmission therethrough of the delayed optical stream 44 when the optical gating signal 62 has a first state (e.g. a low state), and inhibits a transmission therethrough of the delayed optical stream 44 when the optical gating signal 62 has a second state (e.g. a high state).

Figure 2:
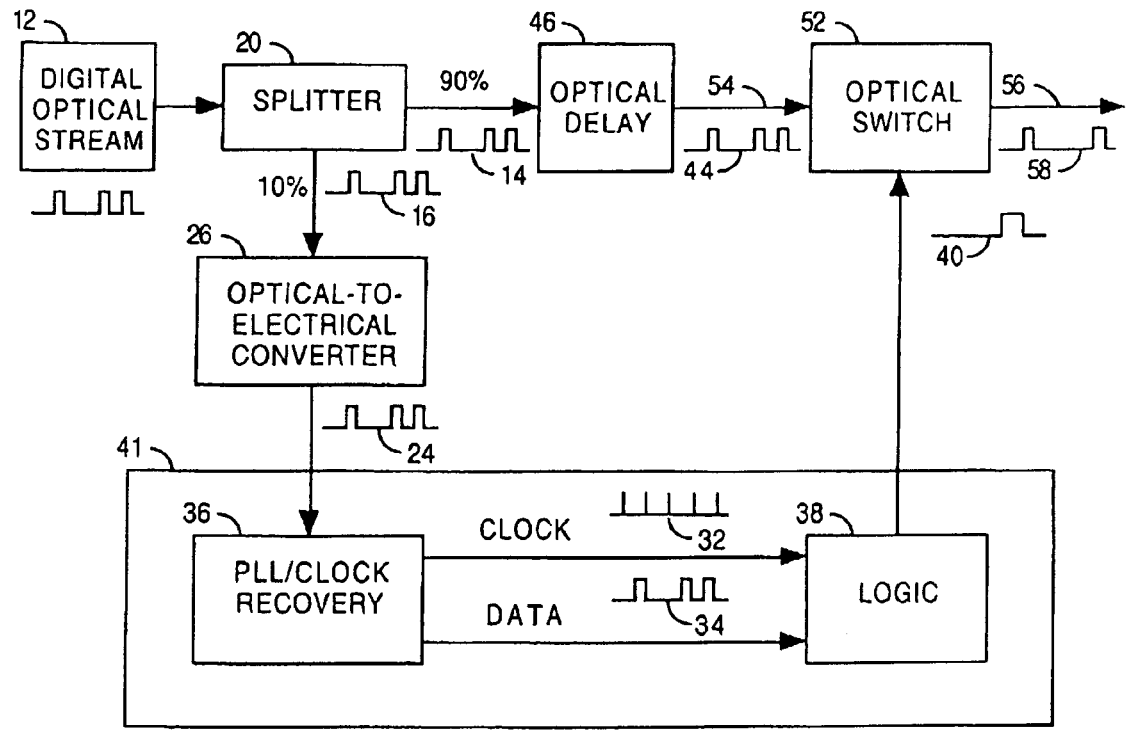
FIG. 2 is a block diagram of an embodiment of a system for providing controlled impairments to an optical transport system.
Figure 4:
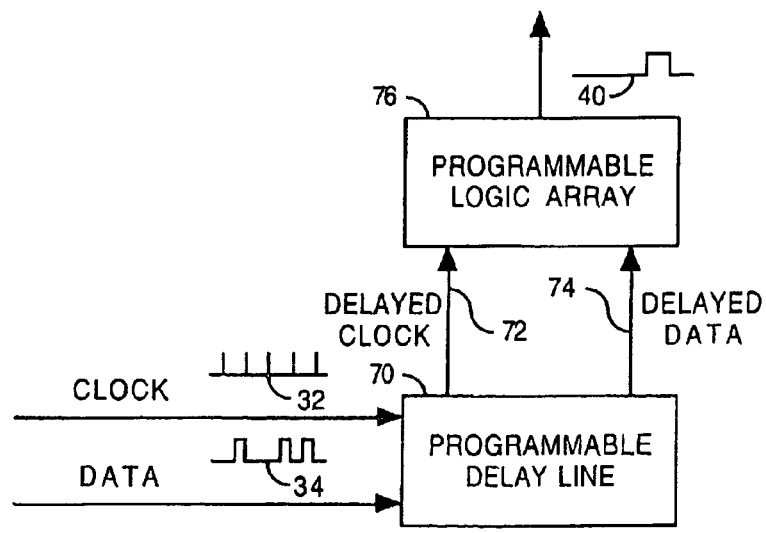
FIG. 4 is a block diagram of an embodiment of the logic component in FIG. 2.

FIG. 4 is a block diagram of an embodiment of the logic component 38 in FIG. 2. The clock signal 32 and the data signal 34 are applied to a programmable delay line 70. Preferably, absent the programmable delay line 70, the optical delay 46 would slightly overcompensate for the delay in the lower path. The programmable delay line 70 performs a relatively fine adjustment to synchronize the lower path with the upper path, i.e. to bring the delayed optical stream 44 in alignment with the gating signal 40. The programmable delay line 70 generates a delayed clock signal 72 and a delayed data signal 74.

A programmable logic array 76 serves to identify the particular portion based on the delayed clock signal 72 and the delayed data signal 74. The programmable logic array 76 can be programmed to allow a user to choose where and what bit region to alter. For example, the programmable logic array 76 can be programmed to perform a pattern-matching logic function.

Figure 5:
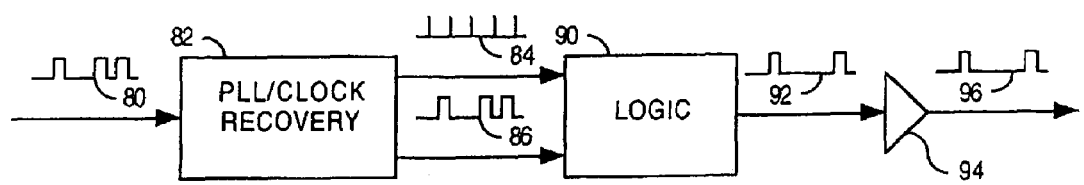
FIG. 5 is a block diagram of an alternative embodiment of a system to modify a particular portion of a digital stream.

FIG. 5 is a block diagram of an alternative embodiment of a system to modify a particular portion of a digital stream 80. In this embodiment, the digital stream 80 has an electrical form. The system comprises a PLL/clock recovery component 82, such as the PLL/clock recovery component 36 described herein, which outputs a clock signal 84 and a data signal 86. A logic component 90 serves to identify the particular portion based on the clock signal 84 and/or the data signal 86, and to modify the particular portion. As with the embodiment of FIG. 2, the particular portion may comprise a specific portion of a SMPTE-standard digital stream such as an active video portion, a HANC portion, a VANC portion, an SAV portion or an EAV portion.

The particular portion can be modified either by inverting one or more bits or suppressing one or more bits. The logic component 90 outputs an electrical signal 92 which is the same as the digital stream 80, except for one or more bits in the particular portion being modified. A buffer 94 is responsive to the logic component 90 to provide a buffered electrical signal 96 based on the electrical signal 92. The buffered electrical signal 96 has suitable output characteristics for transporting to and/or interfacing with a decoder (not illustrated).

Figure 6:
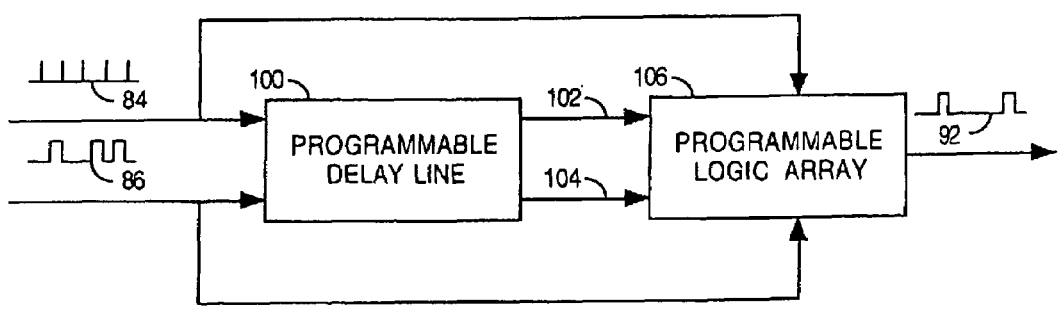
FIG. 6 is a block diagram of an embodiment of the logic component in FIG. 5.

FIG. 6 is a block diagram of an embodiment of the logic component 90 in FIG. 5. The clock signal 84 and the data signal 86 are applied to a programmable delay line 100. The programmable delay line 100 generates a delayed clock signal 102 and a delayed data signal 104. The clock signal 84, the data signal 86, the delayed clock signal 102, and the delayed data signal 104 are applied to the programmable logic array 106. The programmable logic array 106 performs one or more logical operations on the delayed serial data stream within the delayed data signal 104. The programmable logic array 106 can be programmed to allow a user to choose where and what bit region to alter. The programmable logic array 106 can be as simple as an exclusive OR, or as complex as a pattern matching function.

The programmable delay line 100 provides a delay to compensate for a processing time required by a programmable logic array 106 to detect specific portions of the clock signal 84 and/or the data signal 86. Alternatively, the delay may be performed internally in the programmable logic array 106, in which case the programmable delay line 100 may be omitted.

Embodiments described with reference to FIGS. 5 and 6 require no operation in the optical domain. These embodiments are useful in studio applications or in a central office, where all signals have been converted back to electrical signals.

It will be apparent to those skilled in the art that the disclosed inventions may be modified in numerous ways and may assume many embodiments other than the preferred forms specifically set out and described herein.

Accordingly, it is intended by the appended claims to cover all modifications which fall within the true spirit and scope of the present invention.

The invention claimed is:

1. A method comprising:
receiving an optical stream;
identifying a clock signal and a data signal based on the received optical stream;
receiving a selection from a user after receipt of at least a portion of the optical stream, the selection indicating at least a particular bit position of the optical stream to be modified;
determining whether the particular bit position of the optical stream is located in an active video portion, a horizontally ancillary data portion, a vertically ancillary data portion, a start-video timing portion, or an end active video timing portion of the optical stream;

identifying the particular bit position in the determined portion of the optical stream based on at least the clock signal and the data signal; and modifying the particular bit position of the optical stream.

2. The method of claim 1, wherein the optical stream is a SMPTE-standard opitcal stream.

3. The method of claim 2, wherein the SMPTE-standard optical stream is a SMPTE 259M video stream.

4. The method of claim 1, wherein modifying the particular bit position of the optical stream comprises:

inverting at least the particular bit position of the optical stream.

5. The method of claim 1, wherein modifying the particular bit position of the optical stream comprises:

suppressing at least the particular bit position of the optical stream.

6. The method of claim 1, wherein modifying the particular bit position of the optical stream comprises:

introducing a bit error at least at the particular bit position of the optical stream.

7. The method of claim 1, further comprising:

splitting the received optical stream into a primary optical stream and a secondary optical stream; and converting the secondary optical stream to an electrical signal;

wherein identifying the clock signal and the data signal based on the received optical stream comprises:

identifying a clock signal and a data signal from the electrical signal.

8. The method of claim 7, further comprising:

generating a gating signal at the particular bit position of the optical stream;

delaying the primary optical stream to provide a delayed optical stream; and synchronizing the delayed optical stream with the gating signal;

wherein modifying the particular bit position of the optical stream comprises:

modifying the particular bit position of the delayed optical stream based on the gating signal.

9. An apparatus comprising:

a logic component to identify a particular bit position of an optical stream, the logic component operative to:

receive a selection from a user after receipt of at least a portion of the optical stream, the selection indicating at least a particular bit position of an optical stream to be modified;

determine whether the particular bit position of the optical stream is located in an active video portion, a horizontally ancillary data portion, a vertically ancillary data portion, a start-video timing portion, or an end active video timing portion of the optical stream;

identify the particular bit position in the determined portion of the optical stream; and modify the particular bit position of the optical stream.

10. The apparatus of claim 9, wherein the logic component is further operative to:

identify a clock signal and a data signal based on the optical stream;

wherein the logic component identifies the particular position in the determined portion of the optical stream based on the clock signal and the data signal.

11. The apparatus of claim 9, wherein the optical stream is a SMPTE-standard optical stream.

12. The apparatus of claim 9, wherein the optical stream is a SMPTE 259M video stream.

13. The apparatus of claim 9, further comprising:

an optical splitter in communication with the logic component, the optical splitter operative to split the optical stream into a primary optical stream and a secondary optical stream; and an optoelectronic converter in communication with the optical splitter and the logic component, the optoelectronic converter operative to convert the secondary optical stream to an electrical signal;

wherein the logic component Is further operative to identify a clock signal and a data signal from the electrical signal and modify the particular bit position of the optical stream based on the clock signal and the data signal.

* * * * *

UNITED STATES PATENT AND TRADEMARK OFFICE
CERTIFICATE OF CORRECTION

| | |
|---|---|
| PATENT NO. | : 7,489,864 B2 |
| APPLICATION NO. | : 11/598430 |
| DATED | : February 10, 2009 |
| INVENTOR(S) | : Pierre Costa |

It is certified that error appears in the above-identified patent and that said Letters Patent is hereby corrected as shown below:

In column 5, claim 2, line 8, before "stream." delete "opitcal" and substitute --optical-- in its place.

Signed and Sealed this

Thirtieth Day of June, 2009

JOHN DOLL
*Acting Director of the United States Patent and Trademark Office*